US012561398B2

(12) United States Patent
Sivakumar et al.

(10) Patent No.: US 12,561,398 B2
(45) Date of Patent: Feb. 24, 2026

(54) VALIDATION PROCESSING FOR CANDIDATE RETRAINING DATA

(71) Applicant: International Business Machines Corporation, Armonk, NY (US)

(72) Inventors: Gandhi Sivakumar, Bentleigh (AU); Kushal S. Patel, Pune (IN); Sarvesh S. Patel, Pune (IN); Anil Manohar Omanwar, Vikas Nagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1076 days.

(21) Appl. No.: 17/536,230

(22) Filed: Nov. 29, 2021

(65) Prior Publication Data

US 2023/0169147 A1 Jun. 1, 2023

(51) Int. Cl.
*G06F 18/214* (2023.01)
*G06F 18/21* (2023.01)
*G06F 40/30* (2020.01)

(52) U.S. Cl.
CPC ...... *G06F 18/2148* (2023.01); *G06F 18/2193* (2023.01); *G06F 40/30* (2020.01)

(58) Field of Classification Search
CPC .................................................. G06F 18/2148
See application file for complete search history.

(56) References Cited

U.S. PATENT DOCUMENTS 6,021,113 A 2/2000 Doshi et al.
6,845,393 B1 1/2005 Murphy et al.
(Continued)

FOREIGN PATENT DOCUMENTS

| CN | 103959282 A | 7/2014 |
| EP | 3092776 A1 | 11/2016 |
| WO | 2014113367 A1 | 7/2014 |

OTHER PUBLICATIONS ip.com, Corpora Deduplication for Classifier Training, Sep. 25, 2014.

(Continued)

*Primary Examiner* — Haimei Jiang
*Assistant Examiner* — Thomas Bernard Lane
(74) *Attorney, Agent, or Firm* — Garg Law Firm, PLLC; Rakesh Garg; Michael O'Keefe

(57) ABSTRACT

An embodiment generates a candidate retraining dataset in response to a retraining request. The embodiment generates first metadata comprising attribute information for data points in the candidate retraining dataset and second metadata comprising a range of attributes from training data previously used to train the model. The embodiment determines whether the candidate retraining dataset includes new information for the machine learning model based on a comparison of the first metadata to the second metadata. In a first case in which the candidate retraining dataset is determined to include new information, the embodiment initiates retraining of the machine learning model using the candidate retraining dataset. In a second case in which the candidate retraining dataset is determined to not include new information, the embodiment generates a response to the retraining request indicating that retraining the machine learning model using the candidate retraining dataset is not recommended.

20 Claims, 9 Drawing Sheets

(56) References Cited

U.S. PATENT DOCUMENTS

| | | | |
|---|---|---|---|
| 7,962,516 B2 * | 6/2011 | Bahrs ................... | G06F 21/6218 |
| | | | 707/783 |
| 10,896,385 B2 | 1/2021 | Thapliyal et al. | |
| 10,963,810 B2 | 3/2021 | Dirac et al. | |
| 2003/0144849 A1 | 7/2003 | Kakivaya et al. | |
| 2005/0105779 A1 * | 5/2005 | Kamei ................. | G06V 40/171 |
| | | | 382/118 |
| 2009/0210368 A1 * | 8/2009 | Deo ....................... | G06N 5/046 |
| | | | 706/20 |
| 2010/0152878 A1 * | 6/2010 | Chu ....................... | G05B 17/02 |
| | | | 700/110 |
| 2015/0254555 A1 | 9/2015 | Williams, Jr. et al. | |
| 2015/0309992 A1 * | 10/2015 | Visel ..................... | G06F 40/30 |
| | | | 704/9 |
| 2016/0005016 A1 * | 1/2016 | Eliahu ................ | G06Q 20/1235 |
| | | | 705/44 |
| 2019/0311415 A1 * | 10/2019 | Sewak .................. | G06F 40/216 |
| 2021/0191696 A1 * | 6/2021 | Ibarra Von Borstel ... | G06F 8/36 |
| 2021/0216706 A1 * | 7/2021 | Vaughn .................. | G06N 3/082 |

OTHER PUBLICATIONS

Cervantes et al., Data selection based on decision tree for SVM classification on large data sets, Applied Soft Computing, vol. 37, Dec. 2015, pp. 787-798.

ip.com, Identifying Training Data Points from Streaming Data, Aug. 14, 2020.

Ericsson, Optimizing Network Applications for 5G, Apr. 21, 2017, https://www.ericsson.com/en/news/2017/4/optimizing-network-applications-for-5g.

* cited by examiner

WORKLOADS 90

91   92   93   94   95   96

MANAGEMENT 80

81   82   83   84   85

VIRTUALIZATION 70

71   72   73   74   75

HARDWARE AND SOFTWARE 60

SERVICE REGISTRY
304

MACHINE LEARNING SYSTEM
306

API GATEWAY
302

USER DEVICE
308

*Fig. 6*

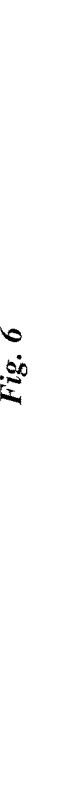

MODEL REPOSITORY 630

TAXONOMY REPOSITORY 632

TRAINING VALIDATION MODULE 600

BASELINE INFORMATION GATHERING MODULE 620

MICROLEVEL NEURAL PARSER MODULE 622

TRAINING METADATA COMPARISON MODULE 624

TRAINING INTENT / ENTITIES EXTRACTION MODULE 626

TRAINING CORPUS VECTOR MAP MODULE 612

SELECTION / DESELECTION DECISION MANAGEMENT MODULE 614

TRAINING DATASET EXTRACTOR AND PARSER MODULE 616

ATTRIBUTE MAPPER MODULE 618

TRAINING DATABASE CONNECTOR MODULE 602

DATA POLICING VALIDATION MODULE 604

METADATA DEFINITION MODULE 606

CORPUS METADATA GENERATOR MODULE 608

LEARNING REQUIREMENT INFERENCE MODULE 610

TRAINING DATA 628

800

START

RECEIVE TRAINING DATASET FOR RETRAINING MODEL
802

ATTRIBUTE VALUE EXTRACTION
804

METADATA GENERATION
806

TRAINED MODEL SELECTED FOR POSSIBLE RETRAINING
808

BAND EXTRACTION AND TRANSFORMATION
810

ATTRIBUTE METADATA GENERATION
812

VARIANCE INFERENCE
814

END

START

900

RECEIVE TRAINING DATASET FOR RETRAINING MODEL
902

TRAINED MODEL SELECTED FOR POSSIBLE RETRAINING
908

NEURAL PARSER
904

MODEL FUNCTION-TAG REPOSITORY
910

INTENT AND ENTITY MAP
906

MLM INTENT-ENTITY STORE
912

INTENT AND ENTITY COMPARE
914

END

VALIDATION PROCESSING FOR CANDIDATE RETRAINING DATA

BACKGROUND

The present invention relates generally to a method, system, and computer program product for data processing. More particularly, the present invention relates to a method, system, and computer program product for validation processing for candidate retraining data.

Artificial intelligence (AI) technology has evolved significantly over the past few years. Modern AI systems include machine learning systems that are achieving human level performance on cognitive tasks like converting speech to text, recognizing objects and images, or translating between different languages. This evolution holds promise for new and improved applications in many industries.

An Artificial Neural Network (ANN)— also referred to simply as a neural network—is an example of a machine learning system that is often used for performing data classification tasks. ANNs are processing devices (algorithms and/or hardware) that are made up of a number of highly interconnected processing elements (nodes) that process information by their dynamic state response to external inputs. ANNs are loosely modeled after the neuronal structure of the mammalian cerebral cortex, but on much smaller scales. A large ANN might have hundreds or thousands of processor units, whereas a mammalian brain has billions of neurons with a corresponding increase in magnitude of their overall interaction and emergent behavior.

A machine learning system that performs data classification is sometimes referred to as a classifier. A classifier is a type of ANN that includes an algorithm that learns a function that separates two or more classes of data. There are many different types of classifiers. Examples include image classifiers that classify images based on what is being depicted (e.g., classifying images as depicting a cat or a dog) and sentiment classifiers that classify text based on what is being expressed (e.g., classifying text as expressing a positive or negative opinion).

A feedforward neural network is an ANN in which connections between the units do not form a cycle. A convolutional neural network (CNN) is an example of a feed-forward ANN that is sometimes used as a classifier. In a CNN, the connectivity pattern between the nodes (neurons) is inspired by the organization of the animal visual cortex, whose individual neurons are arranged to respond to overlapping regions tiling a visual field. As a result, CNNs are particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image, for tasks such as image classification.

A recurrent neural networks (RNN) is another example of a type of ANN that is sometimes used as a classifier. An RNN includes recurrent connections (i.e., feedback connections) that form cycles in the network's topology. In an RNN, a neuron feeds back information to itself in addition to passing it to the next neuron in the RNN. Computations derived from earlier inputs are fed back in the network, which gives an RNN a form of short-term memory. Feedback networks, such as RNNs, are dynamic in that the state of an RNN is continuously changing until it reaches an equilibrium point. For this reason, RNNs are particularly well-suited for detecting relationships across time in a given set of data. Long-Short Term Memory (LSTM) and Gated Recurrent Units (GRU) are types of RNNs that include a state-preserving mechanism through built-in memory cells. These types of RNNs are particularly well-suited for multivariate time series data analysis and forecasting, handwriting recognition, natural language processing, and task synthesis.

A deep neural network (DNN) is another example of an ANN that is sometimes used as a classifier. A DNN has multiple hidden layers of units between the input and output layers. Similar to shallow ANNs, DNNs can model complex non-linear relationships. DNN architectures generate compositional models where the object is expressed as a layered composition of image primitives. The extra layers enable composition of features from lower layers, allowing for the potential of modeling complex data with fewer units than a similarly performing shallow ANN.

In addition to neural networks, there are numerous other machine learning algorithms that are widely used in various applications. Some common examples include linear regression, logistic regression, and support vector machines (SVMs). Linear regression tries to fit a function to a set of input data points and is often used to project values, such as a future asset value or future price of a product. Logistic regression also tries to fit a function to a set of data points, but is typically used to classify data by predicting the likelihood of a data point belonging to a certain class. SVMs are used for both regression and classification, for example by fitting a hyperplane to datapoints and then classifying additional data points based on where they exist relative to the hyperplane. These are but a few examples of the many different machine learning algorithms in use today.

SUMMARY

The illustrative embodiments provide for validation processing for candidate retraining data. An embodiment includes generating, responsive to a retraining request, a retraining batch of data points from a candidate retraining dataset being evaluated for retraining a machine learning model. The embodiment also includes generating first metadata comprising attribute information associated with a class of variation for data points in the candidate retraining dataset. The embodiment also includes generating second metadata comprising a range of attributes associated with the class of variation, where the machine learning model was previously trained using the range of attributes. The embodiment also includes determining whether the candidate retraining dataset includes new information for the machine learning model based on a comparison of the first metadata to the second metadata. The embodiment also includes initiating, in a first case in which the candidate retraining dataset is determined to include new information, retraining of the machine learning model using the candidate retraining dataset. The embodiment also includes initiating, in a second case in which the candidate retraining dataset is determined to not include new information, a response to the retraining request indicating that retraining the machine learning model using the candidate retraining dataset is not recommended. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example service infrastructure that includes a machine learning system in accordance with an illustrative embodiment;

FIG. 6 depicts a block diagram of an example training validation module in accordance with an illustrative embodiment;

DETAILED DESCRIPTION

Figure 1:
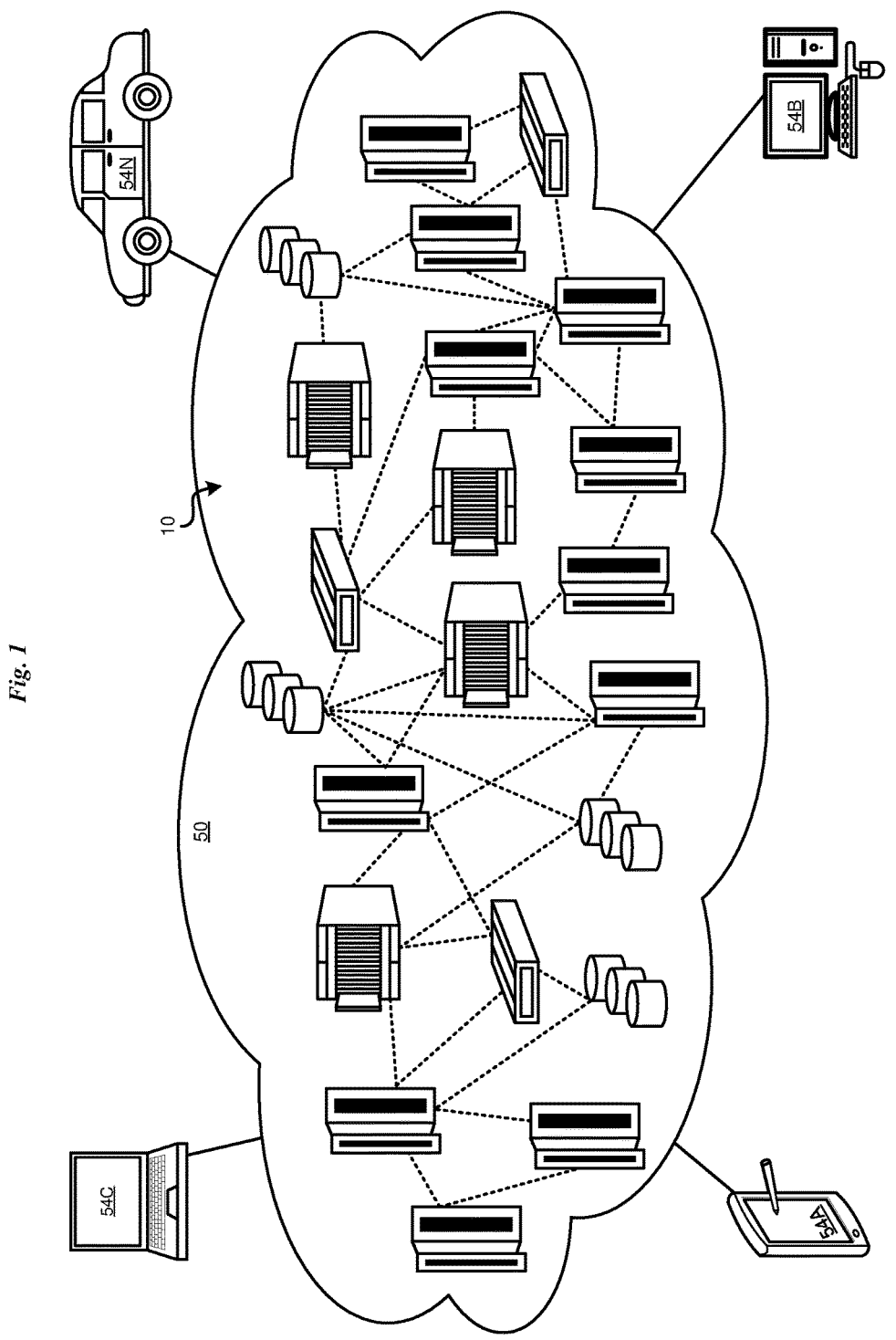
FIG. 1 depicts a cloud computing environment according to an embodiment of the present invention.

Various artificial intelligence ("AI") technologies utilize "cognitive models" enabled by big data platforms. Such models termed as "cognitive entities" are aimed to remember the past, interact with humans, continuously learn, and refine their responses for the future. The cognitive capabilities enrich the automation of complex tasks and provide dynamic responses that improve user satisfaction compared to devices of the past that relied on static memory.

The key component of cognitive systems are machine learning models. These models typically comprise input feature sets and a mathematical model that can be trained to predict various outcomes. The outcomes vary based on the type of machine learning model, its algorithm, the input training corpus, and other interrelated fields. Examples of machine learning models include those used for classification and others used for regression. In the cognitive systems, there could be many machine learning models with different functions and operation feature-sets that work together to predict an outcome.

Each machine learning model is initially trained. Training techniques vary, but typically involve the use of a training dataset that the model uses to build a ground truth of relationships and attributes. The model then uses the ground truth to generate outputs for new inputs once the model is trained and put into production.

The training process is one of the important parts of creating an accurate machine learning model. The training process is heavily of dependent on the contents of the training datasets. There are many things that can go wrong with the training process if the training dataset is not carefully chosen or assembled. For this reason, the training process is a time-intensive and complex task. This is true for the initial training of a machine learning model and for retraining the model after it has been in production.

There are many reasons why one might consider retraining a machine learning model, such as attempting to improve the accuracy of the model or adapting the model to changes that affect certain decisions that the model is tasked with making. For example, a machine learning model used to assist with loan approvals may need to be updated if the loan policy is changed.

A training dataset will often include a vast number of data points that are so numerous that it would be impractical for a human to thoroughly review the dataset in detail. This problem is compounded in a retraining scenario, where there are at least two or more of these enormous datasets to consider, the retraining dataset being considered for use to retrain the model and other training datasets that have previously been used to train the model. Each dataset may have hundreds of thousands or millions of data points.

Since manually reviewing all of these data points would be a monumental task that is well beyond what is practical for a human evaluator, the typical procedure is to just proceed with retraining, and then perform a series of evaluations on the resulting retrained model to try to determine how the model has changed, if it has changed at all. It is entirely possible that the retraining data may not actually vary enough from previously used training data to alter the model by more than a negligible amount. Thus, after expending considerable time and expense to retrain the model, the resulting retrained model may be essentially the same as before.

Aspects of the present disclosure address the deficiencies described above by providing mechanisms (e.g., systems, methods, machine-readable media, etc.) that perform a training data validation process in accordance with disclosed embodiments. In one embodiment of the present disclosure, system, methods and algorithms may be presented to automatically evaluate a candidate training dataset and make a determination as to whether the candidate training dataset includes any new information to teach a trained machine learning model. Embodiments of the present disclosure do not require human intervention, are readily implemented to eliminate the unnecessary time and effort involved in retraining a model only to get negligible results, and are readily adaptable to a wide variety of different types of machine learning models, resulting in an efficient and scalable approach to evaluating candidate training sets for retraining machine learning models.

In some embodiments, a training data validation process (also referred to herein more simply as a validation process) receives a candidate training dataset for retraining a machine learning model as part of a request to retrain a machine learning model. Responsive to this request, the validation process retrieves some or all of the data points from the candidate retraining data. For example, in some embodiments, the process retrieves a random sampling of data points from the retraining data to evaluate.

In some embodiments, the validation process performs attribute value extraction techniques to collect attribute values from the candidate retraining data for use in comparing information in the candidate retraining data to information previously used to train the machine learning model. In some embodiments, the candidate retraining data is primarily composed of numeric attributes. In some such embodiments, the validation process generates a tensor that includes the attribute vectors extracted from the candidate retraining data. In some embodiments, for example where the machine learning model is used for natural language-based analysis, the validation process may retrieve one or more pre-defined taxonomies from a taxonomy repository, where the taxonomies each include a predefined hierarchical classification of various classification objects and their characteristics for the domain modeled by the machine learning model. In some such embodiments, the taxonomy is a tree-like structure that illustrates relationships between objects based on characteristics of the objects. In some embodiments, the validation process derives rich semantic information underlying objects represented by data points in the candidate retraining data to facilitate comparison of the candidate retraining data to the machine learning model.

In some embodiments, the validation process generates metadata for the candidate retraining data. For example, in some embodiments where the attributes in retraining data include numeric values arranged in feature vectors for each of the data points, the validation process assembles the feature vectors into a tensor that is stored as metadata for the candidate retraining data. In some embodiments, the validation process retrieves the predefined classes of variation distinguished by the machine learning model and maps the classes to the attributes in the candidate retraining data feature vectors. In some such embodiments, the validation process stores this mapping information with the metadata for the candidate retraining data. In some embodiments, where the validation process retrieves one or more pre-defined taxonomies from a taxonomy repository and uses the one or more taxonomies to derive semantic information underlying objects represented by data points in the candidate retraining data, the validation process includes this semantic information with the metadata for the candidate retraining data.

In some embodiments, the validation process queries attribute vectors from previously-used training data (i.e., training data that was previously used to train the machine learning model). In some embodiments, the validation process collects attribute vectors from the previously-used training data and determines a range of values for each attribute. The validation process generates these ranges of values, referred to as attribute value bands, for each of the attributes of the previously-used training data. In some embodiments, the validation process retrieves the predefined classes of variation distinguished by the machine learning model and maps the attribute value bands to respective predefined classes of variation.

In some embodiments, the validation process generates metadata for the machine learning model. For example, in some embodiments where the attribute value bands include numeric values, the validation process assembles these ranges of values into a tensor that is stored as metadata for the machine learning model. In some embodiments, the validation process retrieves the predefined classes of variation distinguished by the machine learning model and maps the classes to the attribute value bands and stores this mapping information with the metadata for the machine learning model.

In some embodiments, the validation process compares the information in the candidate retraining data to the information that has already been taught to the machine learning mode. In some such embodiments, the validation process accomplishes this by comparing the attribute values in the candidate retraining data metadata to the attribute value bands in the model metadata. If the attribute values are within the attribute band for the corresponding class, this is not new information for the machine learning model, so training is not needed. If an attribute value is outside the attribute band for the corresponding class, the validation process measures how far the attribute value is outside the attribute band. If the distance is within a predetermined threshold value, then this is still considered not new, or negligible, for the machine learning model, so training is not needed. In some embodiments, if the validation process determines that training is not needed, the validation process issues a response to the retraining request indicating that retraining the machine learning model using the candidate retraining dataset is not recommended.

If the distance is not within a predetermined threshold value, then this is considered new information for the machine learning model, so training is needed. In some embodiments, if the validation process determines that training is needed, the validation process initiates the retraining process for retraining the machine learning model using the candidate retraining dataset.

In some embodiments, for example where the machine learning model is used for natural language-based classification, the validation process performs attribute value extraction techniques to collect attribute values from the candidate retraining data using a semantic parser, such as a microlevel neural parser. In some embodiments, the parser includes a pretrained neural network to identify or recognize entities and a classifier to classify intentions associated with the entities in the training data. In some embodiments, the validation process arranges this extracted data as a triple, for example as <intents, entities, objects>.

In some such embodiments, the validation process generates metadata for the candidate retraining data. For example, in some embodiments, the validation process maps the triples from the training data to predefined classes of variation distinguished by the machine learning model. In some such embodiments, the validation process stores this mapping information with the metadata for the candidate retraining data.

Also, in some such embodiments, the validation process queries attributes from previously-used training data (i.e., training data that was previously used to train the machine learning model). In some embodiments, the validation process collects entities and intentions tuples from the previously-used training data. Then, the validation process generates metadata for the machine learning model that includes the entities and intentions mapped to predefined classes of variation.

Also, in some such embodiments, the validation process compares the information in the candidate retraining data to the information that has already been taught to the machine learning mode. In some such embodiments, the validation process accomplishes this by comparing the entity and intention data from both sets of metadata. If there are no new entities/intentions in the training data, the validation process determines that this is not new information for the machine learning model, so training is not needed. In some embodiments, if the validation process determines that training is not needed, the validation process issues a response to the retraining request indicating that retraining the machine learning model using the candidate retraining dataset is not recommended.

If there are new entities/intentions in the training data, the validation process determines that this is considered new information for the machine learning model, so training is needed. In some embodiments, if the validation process determines that training is needed, the validation process initiates the retraining process for retraining the machine learning model using the candidate retraining dataset.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
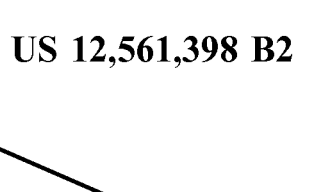
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for machine learning processing using training validation. In addition, workloads and functions 96 for machine learning processing using training validation may include such operations as data analysis and machine learning (e.g., artificial intelligence, natural language processing, etc.), as described herein. In some embodiments, the workloads and functions 96 for machine learning processing using training validation also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
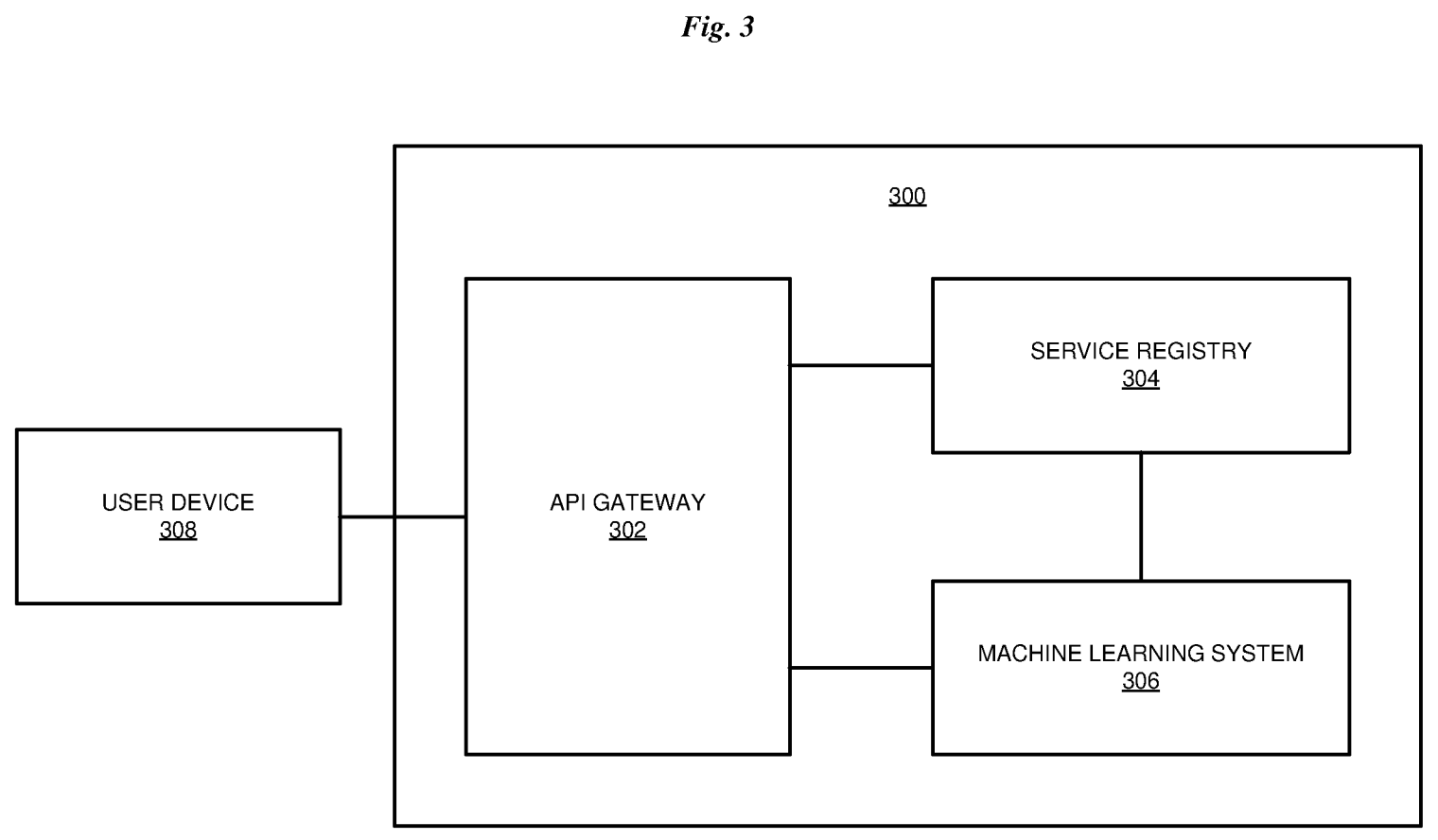

With reference to FIG. 3, this figure depicts a block diagram of an example service infrastructure 300 that includes a machine learning system 306 in accordance with an illustrative embodiment. In some embodiments, the machine learning system 306 is deployed in workloads layer 90 of FIG. 2. By way of example, in some embodiments, machine learning system 306 is implemented as machine learning processing 96 in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated machine learning system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like machine learning system 306. API gateway 302 receives service requests issued by client applications, and creates service lookup requests based on service requests. As a non-limiting example, in an embodiment, the user device 308 is a card reader device that executes an access routine to determine whether to grant access to a workspace in response to a sensed access card.

In the illustrated embodiment, service infrastructure 300 includes a service registry 304. In some embodiments, service registry 304 looks up service instances of machine learning system 306 in response to a service lookup request such as one from API gateway 302 in response to a service request from user device 308. For example, in some embodiments, the service registry 304 looks up service instances of machine learning system 306 in response to requests from the user device 308 related to retraining a machine learning model or related to evaluating a dataset being considered for retraining a machine learning model.

In some embodiments, the service infrastructure 300 includes one or more instances of the machine learning system 306. In some such embodiments, each of the multiple instances of the machine learning system 306 run independently on multiple computing systems. In some such embodiments, machine learning system 306, as well as other service instances of machine learning system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 4:
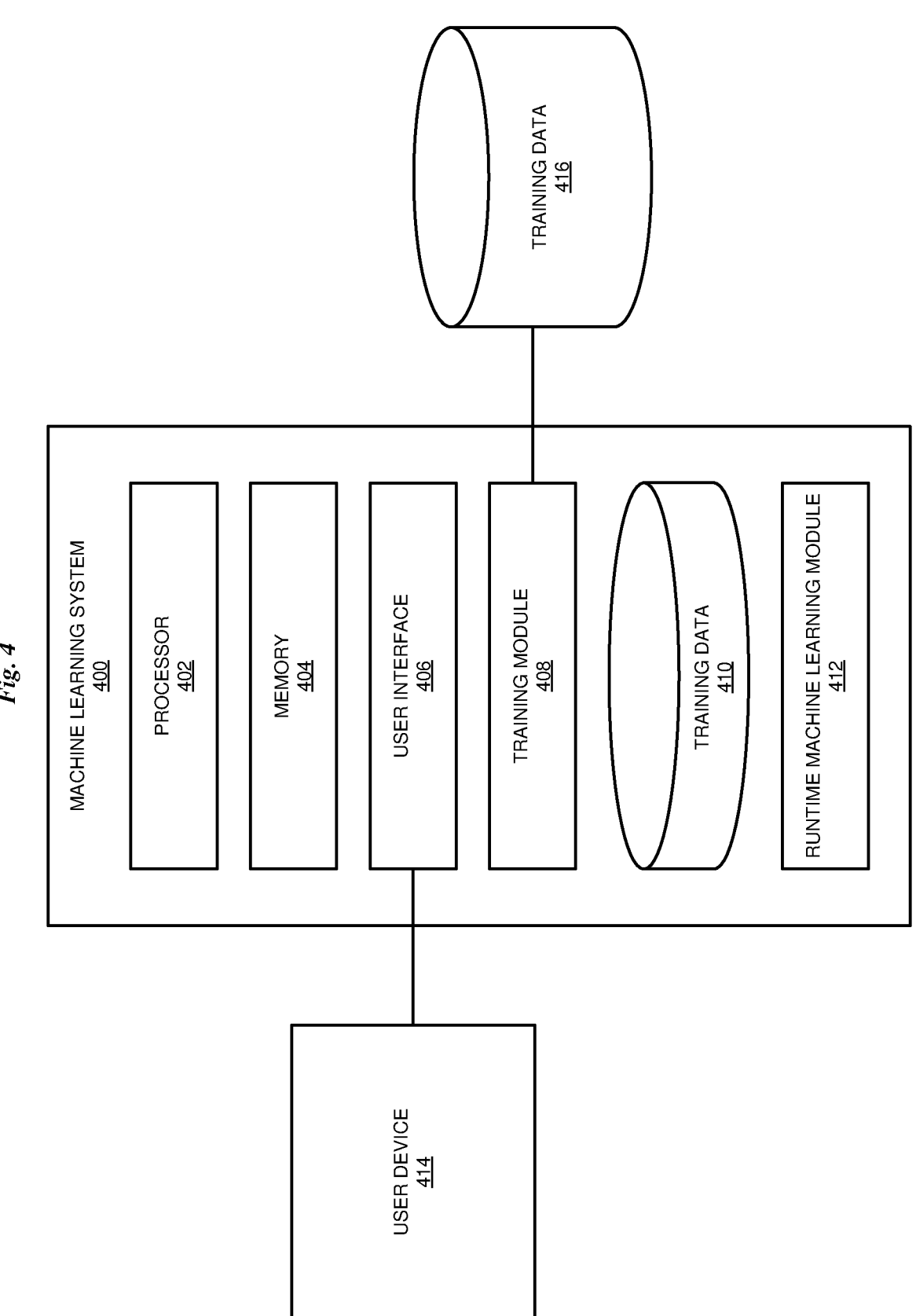
FIG. 4 depicts a block diagram of an example machine learning system in accordance with an illustrative embodiment.

With reference to FIG. 4, this figure depicts a block diagram of an example machine learning system 400 in accordance with an illustrative embodiment. In a particular embodiment, the machine learning system 400 is an example of the workloads and functions 96 for classifier processing of FIG. 1.

In some embodiments, the machine learning system 400 includes a processor 402, memory 404, a user interface 406, a training module 408, a training data database 410, and a runtime machine learning module 412 (or more simply referred to as machine learning module 412). In some embodiments, the machine learning module 412 includes training validation functionality for automatically and autonomously evaluating a candidate retraining dataset. For example, in some embodiments, the machine learning model 412 includes a machine learning model and evaluates candidate retraining datasets for new information that would alter the machine learning model. In alternative embodiments, the machine learning system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the machine learning system 400 includes a processing unit ("processor") 402 to perform various computational and data processing tasks, as well as other functionality. The processing unit 402 is in communication with memory 404. The machine learning system 400 includes a user interface 406, which may include a graphic or command line interface that allows a user to communicate with the machine learning system 400. For example, in some embodiments, the user interface 406 is configured to recognize and take action in response to requests from the user device 414 related to retraining a machine learning model or related to evaluating a dataset being considered for retraining a machine learning model. In some embodiments, a user device 414 may be any known type of computing device, such as a computer, tablet, or smart phone. In some embodiments, the user interface 406 allows communication with the user device 414 via an API gateway (e.g., API gateway 302 of FIG. 3). In some embodiments, the user interface 406 receives one or more bodies of text, images, video frames, or other content for evaluation by the machine learning module 412.

In some embodiments, before the machine learning module 412 includes a machine learning model, and before the machine learning module 412 is put into production, the machine learning model is trained to perform the desired machine learning tasks by the training module 408. The training module 408 trains the machine learning model of the machine learning module 412 using local training data 410 and/or remote training data 416. In some embodiments, training data includes data points in the form of text, images, video, or other content for machine learning tasks, for example classification or natural language processing tasks. In some embodiments, the training data includes a corpus of labels for labeling the data points in the training data.

In some embodiments, from time to time the machine learning model of the machine learning module 412 is retrained, for example to expand or alter the functionality of the machine learning model. The training module 408 retrains the machine learning module 412 using local training data 410 and/or remote training data 416. Training data used for retraining the machine learning model may be referred to herein as retraining data (or "retraining" combined other variations of references to data, such as retraining datasets or retraining data points) to differentiate it from training data used for initially training a new machine learning model. In some embodiments, the training module 408 evaluates candidate retraining data before retraining the machine learning model to determine whether the machine learning model would "learn" anything new from the candidate retraining data. In some embodiments, if the candidate training data includes nothing that would alter the machine learning model, then the training module 408 does not proceed with retraining the machine learning model with that candidate retraining data. In some such embodiments, the training module 408 signals the user interface 406 to issue a message to the user device 414 indicating that the candidate retraining data would not alter the machine learning model so retraining is not recommended. In some embodiments, the retraining data includes data points in the form of text, images, video, or other content for machine learning tasks, for example classification or natural language processing tasks. In some embodiments, the retraining data includes a corpus of labels for labeling the data points in the retraining data.

In some embodiments, the machine learning module 412 includes one or more machine learning models. In some embodiments, the machine learning module 412 includes a classification model that performs classification tasks. As a non-limiting example, in some embodiments, the machine learning module 412 includes a Naïve Bayes classifier based on Bayes' theorem that outputs a class prediction for a given input data point based on one or more features of the input data point using probability. In some embodiments, the machine learning module 412 includes a classification model that performs regression tasks. As a non-limiting example, in some embodiments, the machine learning module 412 includes a linear regression machine learning model that outputs a prediction based on a learned relationship between two continuous variables. In some embodiments, the machine learning model 412 includes one or more machine learning models, non-limiting examples of which include machine learning models that perform image classification, natural-language based classification, logistic regression. In some embodiments, the machine learning module 412 includes a machine learning model that includes a neural network, such as an ANN, for example a CNN, RNN, or DNN. Those skilled in the art will appreciate that still further embodiments may be implemented using various other know classification or regression models.

Figure 5:
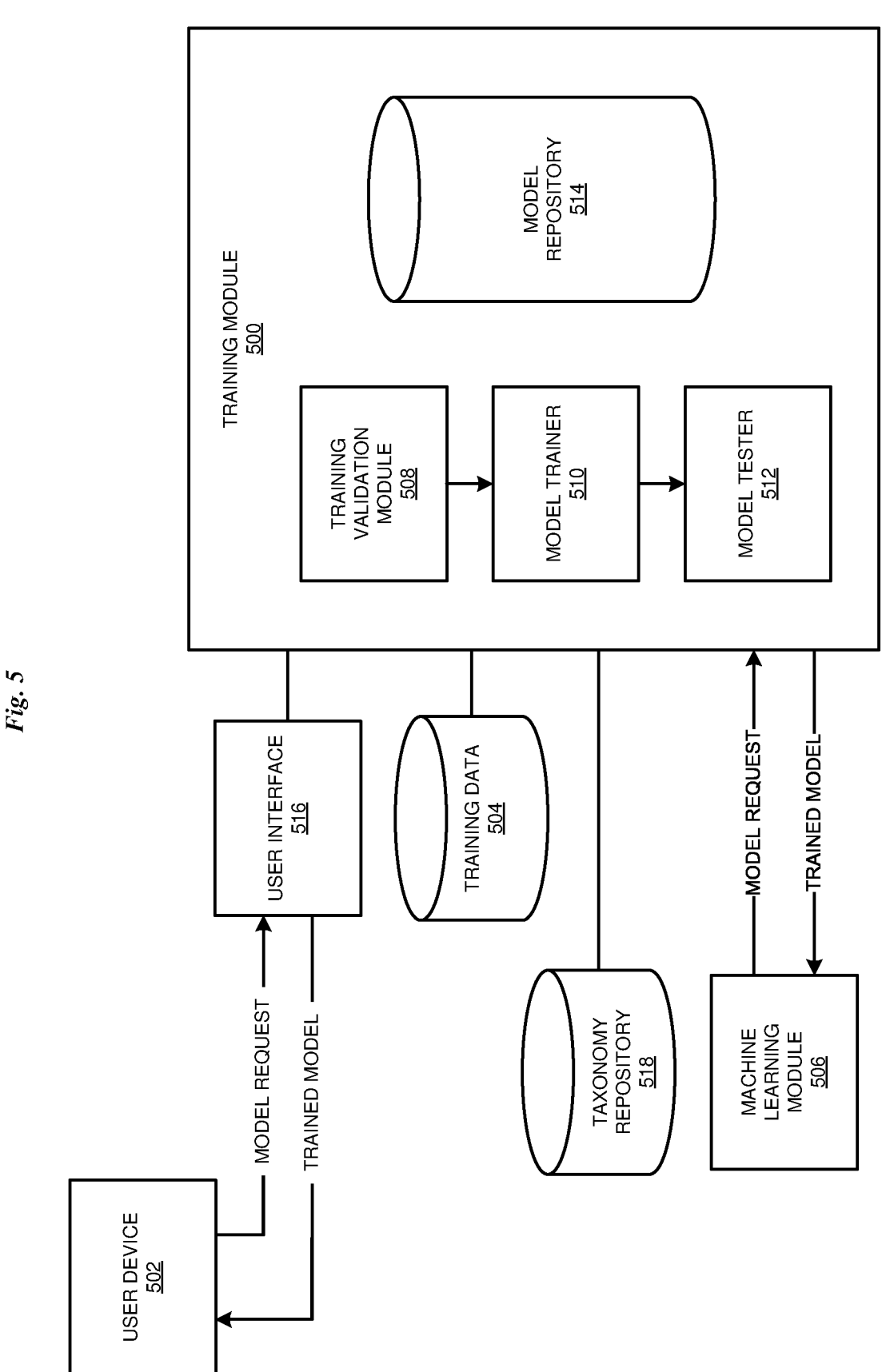
FIG. 5 depicts a block diagram of an example training module in accordance with an illustrative embodiment.

With reference to FIG. 5, this figure depicts a block diagram of an example training module 500 in accordance with an illustrative embodiment. In a particular embodiment, the training module 500 is an example of the training module 408 of FIG. 4.

In some embodiments, the training module 500 includes a training validation module 508, model trainer 510, model tester 512, and model repository 514. The training module 500 is in communication with one or more sources of training data and/or retraining data, which are collectively illustrated as training data 504. In some embodiments, the training module 500 further includes additional functionality understood by those skilled in the art, such as providing a computer readable storage medium for storing training/retraining data or buffering a stream of incoming training/retraining data, and for preprocessing training/retraining data, which may include know preprocessing techniques such as format conversion, amplitude normalization, phase shifting, frequency weighting, blanking, summation, and/or filtering. In alternative embodiments, the training module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the training module 500 operates according to user inputs from a user device 502 via a user interface 516, which is an example of the user interface 406 of FIG. 4. In some embodiments, the training module 500 trains and provides trained models for use by other systems in response to model requests. In some embodiments, the training module 500 trains and provides trained models for use by a local classification module 506, which is an example of machine learning module 412 of FIG. 4.

In some embodiments, the training module 500 performs initial training of new machine learning models using training data 504 appropriate for the current domain being modeled. For example, in some embodiments, the training data 504 includes a training dataset designed to train a machine-learning model that will be able to generalize enough to accurately make predictions about new data, for example about features or objects that are not identical to those in the training data 504.

In some embodiments, the training module 500 trains a machine learning model with a set of training data that builds a ground truth of the machine learning model. The ground truth this then used to generate an output for a machine learning task such as classification or regression inference.

In some embodiments, the training module 500 does not employ the functionality of the training validation module 508 when initially training a new machine learning model. Instead, the training module 500 bypasses the training validation module 508 and automatically invokes the model trainer 510 to train the machine learning model. Once the machine learning model has been trained, from that point forward the training module 500 invokes the training validation module 508 to evaluate the retraining data before instructing the model trainer 510 to retrain the machine learning model. In some embodiments, the training module 500 only invokes the model trainer 510 for retraining if the training validation module 508 determines that the retraining data includes information that would be new to the machine learning model.

In some embodiments, the model trainer 510 trains (or retrains) a machine learning model by inputting data points from the training data into the machine learning model. In some embodiments, the model trainer 510 uses all of the data points from the training data. In alternative embodiments, the model trainer 510 uses a random sampling of data points from the training data to train the machine learning model. The model trainer 510 feeds the data points through the machine learning model for one or more epochs, and the machine learning model tries to "learn" from the training data by creating generalized mappings between the input and output of the model to allow the model to make accurate predictions for new inputs when the correct output is unknown to the model. In some embodiments, the machine learning model includes any of a variety of known algorithms having tunable parameters that are adjusted during the training phase to improve the accuracy of predictions made by the machine learning model. In some embodiments, the training module 500 receives training data 504 and divides it into a training data set provided to the model trainer 510 and a testing data set provided to the model tester 512 so that the trained model can be tested for problems, such as overfitting, before the trained model is ready for production.

In some embodiments, the model trainer 510 uses data points from the training data that are selected by the training validation module 508 as being data points that are useful for retraining the machine learning model. For example, in some embodiments, the training validation module 508 identifies a first subset of the retraining data that will teach something new to the machine learning model and identifies second subset of the retraining data that will not. In some such embodiments, the model trainer 510 then retrains the machine learning model using only the first subset of the retraining data. The result is an improvement in the efficiency of the training module 500 by eliminating unnecessary data points from the retraining data.

In some embodiments, the training module 500 trains a machine learning model based on the attributes and feature-set values of the training datasets and the models. In the training datasets, the corpus is same in many of the cases and hence the intelligence that the machine learning model can be derived from the training data of becomes limited. When a new machine learning model is initially trained, the model learns about the feature attributes by updating various parameters of the model function until the model outputs converge with expected outputs. However, when retraining, if the retraining dataset is too similar to the training data already used to train the model, the machine learning model already knows the data variations from previous training, so the change (if any) to the model function or the vector tensors is often very minimal or insignificant. Since the model is already set up to accurately process the information in the retraining data, retraining the model with such retraining data is not useful and unnecessarily consumes considerable amounts of processing capacity.

From time to time, the training module 500 receives a request to retrain the machine learning model, for example as a user input or as an input from an application, which is accompanied by an indication of retraining data to be used for retraining the machine learning model. Responsive to this request, the training module 500 invokes the training validation module 508 to first evaluate the retraining data. In some embodiments, the training validation module 508 evaluates the retraining data to determine if the retraining data is useful in-fact to train the machine learning model.

In some embodiments, the training validation module 508 helps avoid unnecessary retraining by filtering out training data that presents training redundancies that would at most have negligible effects on the model. The training validation module 508 validates information about teaching variations presented by incoming training datasets being provided for retraining. In some embodiments, the training validation module 508 evaluates retraining data and, based on the evaluation results, decides whether to use the retraining data (or a subset of the retraining data) to retrain the machine learning model.

In some embodiments, the training data is primarily composed of numeric attributes. In some such embodiments, the training validation module 508 generates metadata for the training data that includes the numeric values for the training data attributes. The training validation module 508 also generates metadata for the machine learning model that includes numeric values for attribute value bands for which the model has previously been trained. The training validation module 508 uses the numeric values of these two sets of metadata to compare the model to the training data and determine whether the training data includes anything new to teach the model. In some embodiments, if the numeric values of the training data fall within the attribute value bands of the model, or are within a predetermined threshold distance of the attribute value bands of the model, then the training validation module 508 determines that it is not necessary to train the model using this set of training data because the training data has nothing new to teach the machine learning model.

In some embodiments, for example where the machine learning model is used for natural language-based analysis, the training validation module 508 may use pre-defined taxonomies from a taxonomy repository 518 to facilitate generating of metadata for the training data. In particular embodiments, a taxonomy may include a predefined hierarchical classification of various classification objects and their characteristics for the domain modeled by the machine learning model. In some embodiments, the taxonomy is a tree-like structure that illustrates relationships between objects based on characteristics of the objects. In some embodiments, the training validation module 508 derives rich semantic information underlying objects represented by data points in the training data to facilitate comparison of the training data to the machine learning model. The information gathered from the taxonomy is mapped to the data points in the training data and then included in metadata that describes the training data. The resulting metadata is thereby enriched to with additional information that allows the training validation module 508 to compare the model to the training data and to inferred intent of the data points in the training data.

In some embodiments, for example where the machine learning model is used for natural language-based classification, the training validation module 508 may include a pretrained microlevel neural parser that extracts intents and entities from the training data to facilitate generating of metadata for the training data. In particular embodiments, the ground truth for the model includes a collection of micro level components for the domain modeled by the machine learning model. In some embodiments, the micro level components as well as the intents and entities are included in the metadata for the model and the training data to facilitate comparison of the training data to the machine learning model.

In some embodiments, the training module 500 includes a model tester 512 that monitors the model's ability to make predictions for the testing data set provided by the testing data module 510. For example, in some embodiments, the testing data set includes data that has been processed by the testing data module 510. In other embodiments, the testing data set includes data that has been staged or buffered, but not otherwise preprocessed, by the testing data module 510 (or has been subjected to less pre-processing than the training data) in order to allow the model tester 512 to evaluate the model's ability to generalize and accurately make predictions about the new data of the testing data set 512.

With reference to FIG. 6, this figure depicts a block diagram of an example training validation module 600 in accordance with an illustrative embodiment. In a particular embodiment, the training validation module 600 is an example of the training validation module 508 of FIG. 5.

In some embodiments, the training validation module 600 includes a training database connector module 602, a data policing validation module 604, a metadata definition module 606, a corpus metadata generator module 608, a learning requirement inference module 610, a training corpus vector map module 612, a selection/deselection decision management module 614, a training dataset extractor and parser module 616, an attribute mapper module 618, a baseline information gathering module 620, a microlevel neural parser module 622, a training metadata comparison module 624, and a training intent and entities extraction module 626.

The training validation module 600 is in communication with one or more sources of training data and/or retraining data, which are collectively illustrated as training data 628. The training validation module 600 is also in communication with one or more model repositories, collectively illustrated as model repository 630. In some embodiments, the training validation module 600 is also in communication with one or more taxonomy repositories, collectively illustrated as taxonomy repository 632.

In alternative embodiments, the training validation module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications. The metadata definition module 606 describes the format and dataset structure of the metadata for the model and for the training data, such as XML tags, to facilitate comparison of the two metadata datasets.

In some embodiments, the training database connector module 602 provides for communication with various databases or other sources of training data 628. The data policing validation module 604 provides for preprocessing training/retraining data, which may include know preprocessing techniques such as format conversion, amplitude normalization, phase shifting, frequency weighting, blanking, summation, and/or filtering.

In some embodiments, for example where the machine learning model is used for natural language-based analysis or classification, the training dataset extractor and parser module 616 performs shallow and/or deep parsing of natural language content in the training data. Shallow parsing is a term used to describe lexical parsing of a given content using natural language processing (NLP). For example, given a sentence, an NLP engine determines what the sentence semantically means according to the grammar of the language of the sentence. This process is an example of lexical parsing, also referred to as shallow parsing. In contrast, deep parsing is a process of recognizing the relationships, predicates, or dependencies, and thereby extracting new, hidden, indirect, or detailed structural information and contextual meaning from content portions in a given document or some corpora.

The corpus metadata generator module 608 generates metadata for the training data 628, including values representative of attributes of the training data. In some embodiments, the 608 uses information from the training corpus vector map module 612, which maps feature vectors of the training data to sets of attributes of the machine learning model, which in turn uses information from the attribute mapper module 618. The attribute mapper module 618 provides attribute mapping information for mapping individual attributes of the training data to predefined classes of variation distinguished by the machine learning model.

In some embodiments, for example where the machine learning model is used for natural language-based analysis, the learning requirement inference module 610 may use pre-defined taxonomies from a taxonomy repository 632 to derive semantic information underlying objects represented by data points in the training data to facilitate comparison of the training data to the machine learning model. In some embodiments, for example where the machine learning model is used for natural language-based classification, the microlevel neural parser module 622 identifies salient components of the training data that relate to predefined classes of variation distinguished by the machine learning model. The microlevel neural parser module 622 provides this information to the training intent and entities extraction module 626, which extracts inferred intents and entities from the training data to facilitate generating of metadata for the training data. In particular embodiments, the ground truth for the model includes a collection of micro level components for the domain modeled by the machine learning model. In some embodiments, the micro level components as well as the intents and entities are included in the metadata for the model and the training data to facilitate comparison of the training data to the machine learning model.

The baseline information gathering module 620 queries attribute vectors from previously-used training data in the model repository 630. The baseline information gathering module 620 uses the attribute vectors to establish attribute value bands for each attribute used in training the machine learning model. The attribute value bands are used to generate metadata for the machine learning model that can be used for comparison with the candidate retraining data by the training metadata comparison module 624. The results of this comparison are provided to the selection/deselection decision management module 614, which determines whether to retrain the machine learning model using the candidate retraining data (shown as training data 628).

Figure 7:
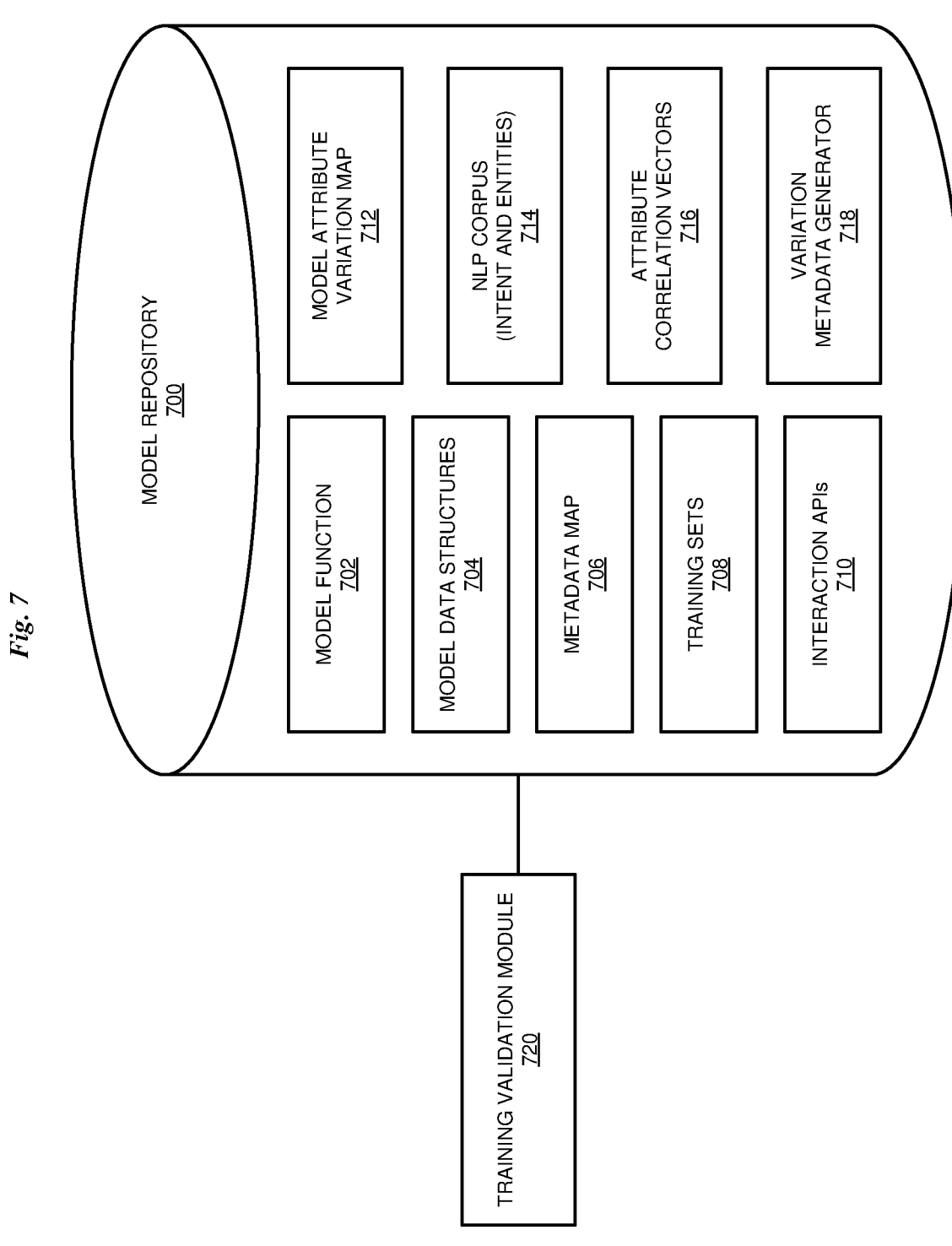
FIG. 7 depicts a block diagram of an example model repository in accordance with an illustrative embodiment.

With reference to FIG. 7, this figure depicts a block diagram of an example model repository 700 in accordance with an illustrative embodiment. In a particular embodiment, the model repository 700 is an example of the model repository 630 of FIG. 6.

In the illustrated embodiment, the model repository 700 stores information about a machine learning model being considered for retraining, such as the model function 702, model data structures 704, and training sets 708 that include training data previously used to train the machine learning model. Various alternative embodiments may include one or more other types of data and database functionality shown in the illustrated embodiment. The illustrated embodiment shows that the model repository 700 may be used to store the various pieces of data generated by the training validation module 720, such as metadata maps 706, model attribute variation maps 712, NLP corpus (intent and entities) data 714, and attribute correlation vectors 716.

In some embodiments, the model repository 700 may also include interaction APIs data 710, which defines one or more APIs that may be used by other modules or applications to interact with the training validation module 720 and/or model repository 700. In some embodiments, the model repository 700 includes a variation metadata generator 718 for generating metadata about the machine learning model, such as attribute vectors from previously used training data and attribute value bands generated based on ranges of values in the previously used training data for each of the attributes.

Figure 8:
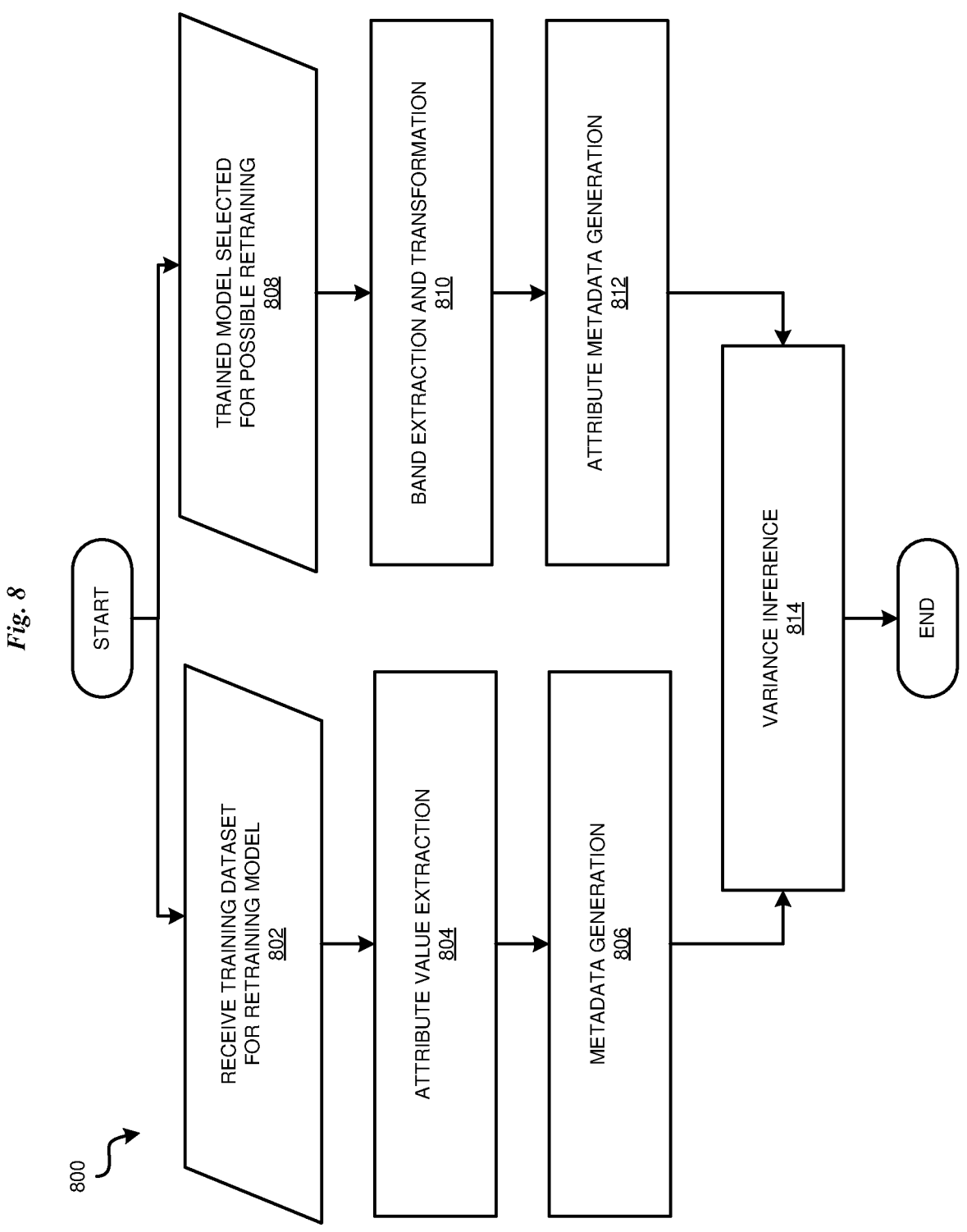
FIG. 8 depicts a schematic flow diagram of an example training validation process in accordance with an illustrative embodiment.

With reference to FIG. 8, this figure depicts a schematic flow diagram of an example training validation process 800 in accordance with an illustrative embodiment. In a particular embodiment, the training validation process 800 is performed by any of the disclosed training validation modules, such as the training validation module 508 of FIG. 5 or the training validation module 600 of FIG. 6.

In an embodiment, at block 802, the process 800 receives a training dataset for retraining a machine learning model. In some embodiments, from time to time, the process 800 receives a request to retrain the machine learning model, for example as a user input or as an input from an application, which is accompanied by an indication of retraining data to be used for retraining the machine learning model. In some such embodiments, responsive to this request, the process 800 retrieves some or all of the data points from the indicated retraining data. For example, in some embodiments, the process 800 retrieves a random sampling of data points from the retraining data to evaluate.

Next, at block 804, the process 800 performs attribute value extraction techniques to collect attribute values from the retraining data for use in comparing information in the retraining data to information previously used to train the machine learning model. In some embodiments, the retraining data is primarily composed of numeric attributes. In some such embodiments, the process 800 generates a tensor that includes the attribute vectors extracted from the retraining data. In some embodiments, for example where the machine learning model is used for natural language-based analysis, the process 800 may retrieve one or more predefined taxonomies from a taxonomy repository, where the taxonomies each include a predefined hierarchical classification of various classification objects and their characteristics for the domain modeled by the machine learning model. In some such embodiments, the taxonomy is a tree-like structure that illustrates relationships between objects based on characteristics of the objects. In some embodiments, the process 800 derives rich semantic information underlying objects represented by data points in the retraining data to facilitate comparison of the retraining data to the machine learning model.

Next, at block 806, the process 800 generates metadata for the retraining data. For example, in some embodiments where the attributes in retraining data include numeric values arranged in feature vectors for each of the data points, the process 800 assembles the feature vectors into a tensor that is stored as metadata for the retraining data. In some embodiments, the process 800 retrieves the predefined classes of variation distinguished by the machine learning model and maps the classes to the attributes in the retraining data feature vectors. In some such embodiments, the process 800 stores this mapping information with the metadata for the retraining data. In some embodiments, where the process 800 retrieves one or more pre-defined taxonomies from a taxonomy repository and uses the one or more taxonomies to derive semantic information underlying objects represented by data points in the retraining data, the process 800 includes this semantic information with the metadata for the retraining data.

In parallel with blocks 802-806, which involve generating metadata for the retraining data, the process 800 also performs blocks 808-812, which involve generating metadata for the machine learning model. Thus, as indicated at block 808, the process 800 identifies a trained model, for example in a model repository, that has been selected for possible retraining.

At block 810, the process queries attribute vectors from previously-used training data (i.e., training data that was previously used to train the machine learning model). In some embodiments, the process 800 collects attribute vectors from the previously-used training data and determines a range of values for each attribute. The process 800 generates these ranges of values, referred to as attribute value bands, for each of the attributes of the previously-used training data. In some embodiments, the process 800 retrieves the predefined classes of variation distinguished by the machine learning model and maps the attribute value bands to respective predefined classes of variation.

Next, at block 812, the process 800 generates metadata for the machine learning model. For example, in some embodiments where the attribute value bands include numeric values, the process 800 assembles these ranges of values into a tensor that is stored as metadata for the machine learning model. In some embodiments, the process 800 retrieves the predefined classes of variation distinguished by the machine learning model and maps the classes to the attribute value bands and stores this mapping information with the metadata for the machine learning model.

Finally, at block 814, the process 800 compares the information in the candidate retraining data to the information that has already been taught to the machine learning mode. In some such embodiments, the process accomplishes this by comparing the attribute values in the retraining data metadata to the attribute value bands in the model metadata. If the attribute values are within the attribute band for the corresponding class, this is not new information for the machine learning model, so training is not needed. If an attribute value is outside the attribute band for the corresponding class, the process 800 measures how far the attribute value is outside the attribute band. If the distance is within a predetermined threshold value, then this is still considered not new, or negligible, for the machine learning model, so training is not needed. If the distance is not within a predetermined threshold value, then this is considered new information for the machine learning model, so training is needed.

Figure 9:
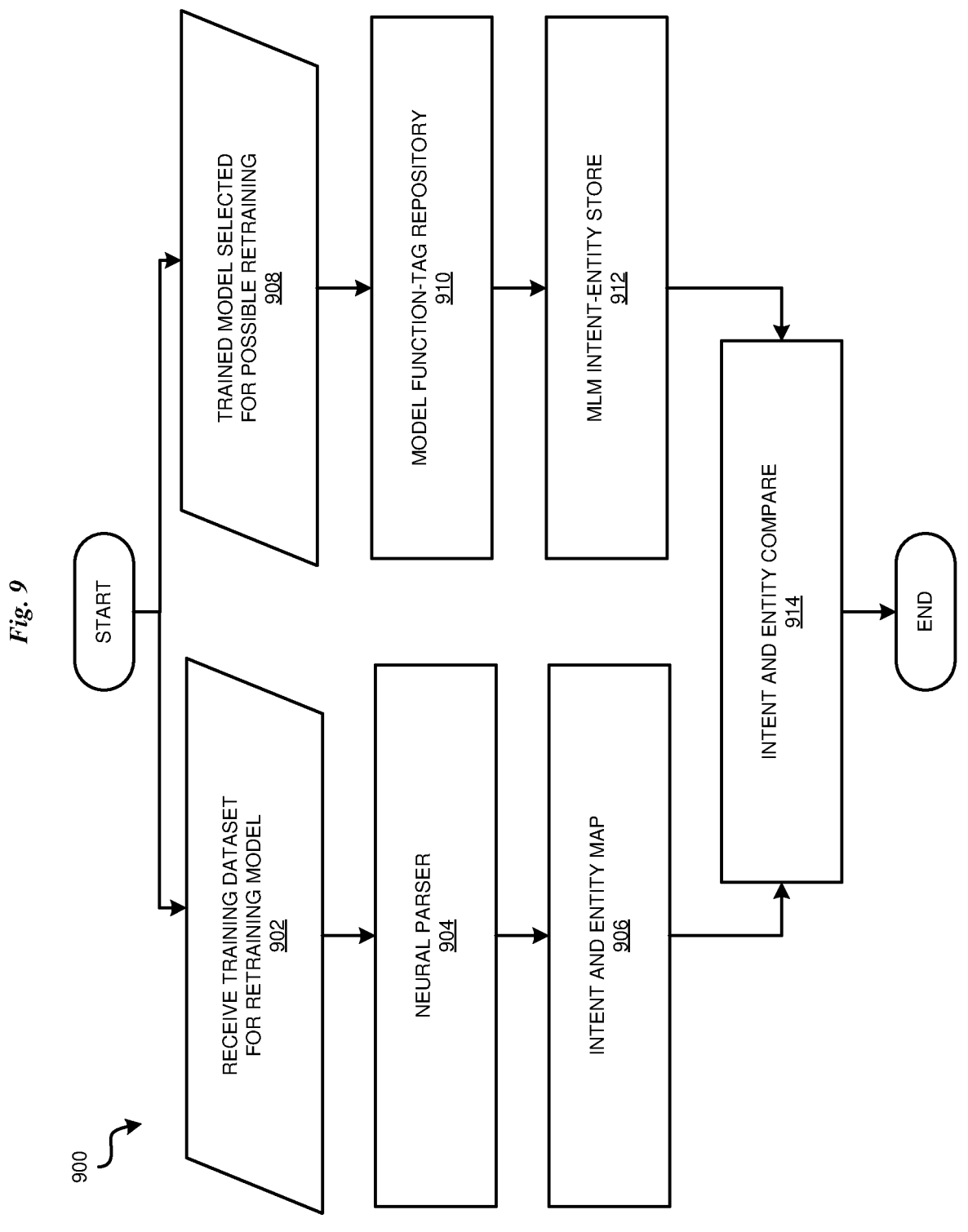
FIG. 9 depicts a schematic flow diagram of an alternative example of a training validation process in accordance with an illustrative embodiment.

With reference to FIG. 9, this figure depicts a schematic flow diagram of an alternative example of a training validation process 900 in accordance with an illustrative embodiment. In a particular embodiment, the training validation process 900 is performed by any of the disclosed training validation modules, such as the training validation module 508 of FIG. 5 or the training validation module 600 of FIG. 6.

In an embodiment, at block 902, the process 900 receives a training dataset for retraining a machine learning model. In some embodiments, from time to time, the process 900 receives a request to retrain the machine learning model, for example as a user input or as an input from an application, which is accompanied by an indication of retraining data to be used for retraining the machine learning model. In some such embodiments, responsive to this request, the process 900 retrieves some or all of the data points from the indicated retraining data. For example, in some embodiments, the process 900 retrieves a random sampling of data points from the retraining data to evaluate.

Next, at block 904, the process 900 performs attribute value extraction techniques to collect attribute values from the retraining data for use in comparing information in the retraining data to information previously used to train the machine learning model. In some embodiments, for example where the machine learning model is used for natural language-based classification, the process 900 uses a semantic parser, such as a microlevel neural parser. In some embodiments, the parser includes a pretrained neural network to identify or recognize entities and a classifier to classify intentions associated with the entities in the training data. In some embodiments, the process 900 arranges this extracted data as a triple, for example as <intents, entities, objects>.

Then, at block 906, the process 900 generates metadata for the retraining data. For example, in some embodiments, the process 900 maps the triples from the training data to predefined classes of variation distinguished by the machine learning model. In some such embodiments, the process 900 stores this mapping information with the metadata for the retraining data.

In parallel with blocks 902-906, which involve generating metadata for the retraining data, the process 900 also performs blocks 908-912, which involve generating metadata for the machine learning model. Thus, as indicated at block 908, the process 900 identifies a trained model, for example in a model repository, that has been selected for possible retraining.

At block 910, the process queries attributes from previously-used training data (i.e., training data that was previously used to train the machine learning model). In some embodiments, the process 900 collects entities and intentions tuples from the previously-used training data. Then, at block 912, the process 900 generates metadata for the machine learning model that includes the entities and intentions mapped to predefined classes of variation.

Finally, at block 914, the process 900 compares the information in the candidate retraining data to the information that has already been taught to the machine learning mode. In some such embodiments, the process accomplishes this by comparing the entity and intention data from both sets of metadata. If there are no new entities/intentions in the training data, the process 900 determines that this is not new information for the machine learning model, so training is not needed. If there are new entities/intentions in the training data, the process 900 determines that this is considered new information for the machine learning model, so training is needed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:

improving a time and cost efficiency of retraining a machine learning model (model), the improving comprising:

generating, responsive to a retraining request, a retraining batch of data points from a candidate retraining dataset being evaluated for retraining a model;

generating first metadata comprising attribute information associated with a class of variation for data points in the candidate retraining dataset;

configuring a semantic parser as a microlevel neural parser to parse the candidate retraining dataset and recognize an entity and an intention associated with the entity;

enriching the first metadata by operating the pretrained microlevel neural parser to extract and include in the first metadata an intent inference drawn from the data points in the candidate retraining dataset;

generating second metadata comprising a range of attributes associated with the class of variation, wherein the model was previously trained using the range of attributes;

determining whether the candidate retraining dataset includes new information for the model based on a comparison of, the comparison outputting relative to a threshold a distance value between a representation of the first metadata and a representation of the second metadata;

further determining, responsive to the distance value not exceeding the threshold, whether the candidate retraining data will cause a less than a second threshold amount of effect on the model; and causing one of (i) sending an automatic invocation to the model trainer, responsive to the distance value exceeding the threshold, the invocation initiating a retraining of the model using the candidate retraining dataset, and (ii); avoiding sending the automatic invocation to the model trainer, responsive to the candidate retraining dataset causing the less than the second threshold amount of effect on the model, the avoiding preventing a consumption of a computing resource on the retraining on the model.

2. The method of claim 1, wherein the generating of the first metadata comprises collecting attribute values from a plurality of feature vectors in the candidate retraining dataset.

3. The method of claim 2, wherein the generating of the first metadata comprises generating a tensor that includes the plurality of feature vectors from the candidate retraining dataset.

4. The method of claim 3, wherein the generating of the second metadata comprises generating an attribute value band that includes a range of values from a training dataset previously used to train the machine learning model.

5. The method of claim 4, wherein the comparison of the first metadata to the second metadata comprises determining if an attribute value of the tensor is within the attribute value band of the machine learning model.

6. The method of claim 3, further comprising retrieving a plurality of predefined classes of variation distinguished by the machine learning model from a model repository.

7. The method of claim 6, further comprising mapping attributes of the feature vectors to respective classes of variation.

8. The method of claim 1, wherein the generating of the first metadata comprises retrieving a pre-defined taxonomy from a taxonomy repository.

9. The method of claim 8, wherein the generating of the first metadata comprises deriving semantic information for a data point in the candidate retraining dataset using the pre-defined taxonomy.

10. The method of claim 1, wherein the generating of the first metadata comprises identifying an entity and associated intention as attribute information in the candidate retraining dataset using a semantic parser.

11. The method of claim 10, further comprising mapping the entity and associated intention to the class of variation.

12. A computer program product, the computer program product comprising one or more computer readable storage media, and program instructions collectively stored on the one or more computer readable storage media, the program instructions executable by one or more processors to cause the one or more processors to perform operations comprising:

improving a time and cost efficiency of retraining a machine learning model (model), the improving comprising:

generating, responsive to a retraining request, a retraining batch of data points from a candidate retraining dataset being evaluated for retraining a model;

generating first metadata comprising attribute information associated with a class of variation for data points in the candidate retraining dataset;

configuring a semantic parser as a microlevel neural parser to parse the candidate retraining dataset and recognize an entity and an intention associated with the entity;

enriching the first metadata by operating the pretrained microlevel neural parser to extract and include in the first metadata an intent inference drawn from the data points in the candidate retraining dataset;

generating second metadata comprising a range of attributes associated with the class of variation, wherein the model was previously trained using the range of attributes;

determining whether the candidate retraining dataset includes new information for the model based on a comparison of, the comparison outputting relative to a threshold a distance value between a representation of the first metadata and a representation of the second metadata;

further determining, responsive to the distance value not exceeding the threshold, whether the candidate retraining data will cause a less than a second threshold amount of effect on the model; and causing one of (i) sending an automatic invocation to the model trainer, responsive to the distance value exceeding the threshold, the invocation initiating a retraining of the model using the candidate retraining dataset, and (ii); avoiding sending the automatic invocation to the model trainer, responsive to the candidate retraining dataset causing the less than the second threshold amount of effect on the model, the avoiding preventing a consumption of a computing resource on the retraining on the model.

13. The computer program product of claim 12, wherein the stored program instructions are stored in a computer readable storage device in a data processing system, and wherein the stored program instructions are transferred over a network from a remote data processing system.

14. The computer program product of claim 12, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

15. The computer program product of claim 12, wherein the generating of the first metadata comprises collecting attribute values from a plurality of feature vectors in the candidate retraining dataset.

16. The computer program product of claim 15, wherein the generating of the first metadata comprises generating a tensor that includes the plurality of feature vectors from the candidate retraining dataset.

17. The computer program product of claim 16, wherein the generating of the second metadata comprises generating an attribute value band that includes a range of values from a training dataset previously used to train the machine learning model.

18. A computer system comprising one or more processors and one or more computer readable storage media, and program instructions collectively stored on the one or more computer readable storage media, the program instructions executable by the one or more processors to cause the one or more processors to perform operations comprising:

improving a time and cost efficiency of retraining a machine learning model (model), the improving comprising:

generating, responsive to a retraining request, a retraining batch of data points from a candidate retraining dataset being evaluated for retraining a model;

generating first metadata comprising attribute information associated with a class of variation for data points in the candidate retraining dataset;

configuring a semantic parser as a microlevel neural parser to parse the candidate retraining dataset and recognize an entity and an intention associated with the entity;

enriching the first metadata by operating the pretrained microlevel neural parser to extract and include in the first metadata an intent inference drawn from the data points in the candidate retraining dataset;

generating second metadata comprising a range of attributes associated with the class of variation, wherein the model was previously trained using the range of attributes;

determining whether the candidate retraining dataset includes new information for the model based on a comparison of, the comparison outputting relative to a threshold a distance value between a representation of the first metadata and a representation of the second metadata;

further determining, responsive to the distance value not exceeding the threshold, whether the candidate retraining data will cause a less than a second threshold amount of effect on the model; and causing one of (i) sending an automatic invocation to the model trainer, responsive to the distance value exceeding the threshold, the invocation initiating a retraining of the model using the candidate retraining dataset, and (ii); avoiding sending the automatic invocation to the model trainer, responsive to the candidate retraining dataset causing the less than the second threshold amount of effect on the model, the avoiding preventing a consumption of a computing resource on the retraining on the model.

19. The computer system of claim 18, wherein the generating of the first metadata comprises collecting attribute values from a plurality of feature vectors in the candidate retraining dataset.

20. The computer system of claim 19, wherein the generating of the first metadata comprises generating a tensor that includes the plurality of feature vectors from the candidate retraining dataset.

* * * * *